United States Patent [19]

Albach et al.

[11] Patent Number: 5,059,869

[45] Date of Patent: Oct. 22, 1991

[54] CIRCUIT ARRANGEMENT FOR THE OPERATION OF HIGH-PRESSURE GAS DISCHARGE LAMPS BY MEANS OF A PULSATORY SUPPLY CURRENT

[75] Inventors: Manfred Albach, Aachen; Hans-Peter Stormberg, Stolberg; Armin F. Wegener, Aachen, all of Fed. Rep. of Germany

[73] Assignee: U.S. Philips Corporation, New York, N.Y.

[21] Appl. No.: 127,825

[22] Filed: Dec. 1, 1987

[30] Foreign Application Priority Data

Dec. 2, 1986 [DE] Fed. Rep. of Germany ....... 3641070

[51] Int. Cl.[5] ............................................ H05B 37/02
[52] U.S. Cl. .................... 315/289; 315/224; 315/244; 315/307; 315/DIG. 7; 315/DIG. 5
[58] Field of Search ............ 315/209 R, 107, 224, 315/244, 247, 307, DIG. 5, DIG. 7, 283, 107; 313/634, 105

[56] References Cited

U.S. PATENT DOCUMENTS

| | | | |
|---|---|---|---|
| 3,890,537 | 6/1975 | Park et al. | 315/DIG. 7 |
| 4,060,752 | 11/1977 | Walker | 315/307 |
| 4,128,789 | 12/1978 | Owen | 315/209 R |
| 4,360,783 | 11/1982 | Nagasawa et al. | 315/307 |
| 4,472,661 | 9/1984 | Culver | 315/307 |
| 4,536,680 | 8/1985 | Roberts | 315/307 |
| 4,594,531 | 6/1986 | Ganser et al. | 315/307 |
| 4,700,113 | 10/1987 | Stupp et al. | 315/219 |
| 4,724,360 | 2/1988 | Luursema | 315/219 |

Primary Examiner—Michael Razavi
Attorney, Agent, or Firm—Bernard Franzblau

[57] ABSTRACT

In a circuit arrangement for the operation of high-pressure gas discharge lamps by means of a pulsatory supply current having a pulse recurrence frequency between 50 and 2000 Hz and a duty cycle between 0.2 and 0.8, a current having a high-frequency between 20 and 200 kHz is superimposed on the current pulses and with a modulation ratio beween 0.3 and 1. The high-frequency is an integral multiple of the pulse recurrence frequency. Thus, flickering of the lamps is avoided.

7 Claims, 2 Drawing Sheets

CIRCUIT ARRANGEMENT FOR THE OPERATION OF HIGH-PRESSURE GAS DISCHARGE LAMPS BY MEANS OF A PULSATORY SUPPLY CURRENT

BACKGROUND OF THE INVENTION

This invention relates to a circuit arrangement for the operation of at least one high-pressure gas discharge lamp by means of a pulsatory supply current having a pulse recurrence frequency between 50 and 2000 Hz and a duty cycle between 0.2 and 0.8.

Such a circuit arrangement for the operation of high-pressure sodium vapour discharge lamps is known, for example, from U.S. Pat. No. 4,128,789. A pulse operation can also be used, however, in high-pressure mercury vapour discharge lamps and in high-pressure metal halide vapour discharge lamps. For the pulse operation, both unipolar and bipolar pulses are suitable (DE-PS 26 57 824). An advantage of the pulse operation of high-pressure gas discharge lamps in the aforementioned frequency range consists in that the lamps do not exhibit any acoustic resonance, at least in part of the frequency range. Any acoustic resonance would become manifest in flickering of the luminous arc (DE-PS that 31 11 561). It is further known from this DE-PS to avoid acoustic resonance in high-pressure gas discharge )amps operated at a high-frequency voltage, the high-frequency sinusoidal fundamental wave of 15 to 50 kHz has superimposed on it its third harmonic. The light output and the coulour temperature of lamps operated in this manner are not so favourable, however, as compared with pulse operation.

In the case of pulse operation of high-pressure gas discharge lamps, the stabilization of the lamp current solely by passive elements, such as, for example, a choke coil, is very impractical. Instead, the current stabilization must rather be obtained by electronic means.

With pulse operation of high-pressure gas discharge lamps having electronic ballast units, however, a so-called flickering of the lamps often occurs. This flickering comes about because the luminous flux of the lamps is varied periodically or abruptly. Although the luminous arc itself then remains stable, the luminance of the lamp fluctuates to such an extent that the human eye can observe these variations.

SUMMARY OF THE INVENTION

Therefore, an object of the invention is to provide a circuit arrangement for the pulse operation of high-pressure gas discharge lamps by means of which stabilization of the lamp supply current is attained and flickering of the lamp is avoided.

According to the invention, in a circuit arrangement of the kind mentioned in the opening paragraph this object is achieved in that a current having a high-frequency between 20 and 200 kHz is superimposed with a modulation ratio between 0.3 and 1 on the current pulses, the high-frequency being an integral multiple of the pulse recurrence frequency.

A stabilization of the lamp current is attained by a high-frequency switching within the low-frequency current pulses. The light intensity fluctuations then obtained having, frequencies corresponding to the high-frequency and to the recurrence pulse frequency, are not resolved by the human eye and therefore are not at all important to the pulse operation of high-pressure gas discharge lamps. However, it has been found that an additional unperiodical flickering or a periodical flickering at frequencies below 50 Hz can be obtained. It has been found that this flickering can be avoided if the pulse recurrence frequency is synchronized with the superimposed high-frequency. According to the invention, this is obtained in that for the high-frequency an integral multiple of the Pulse recurrence frequency is chosen. Thus, it is achieved that the phase position of the hi? h-frequency at the beginning of each current pulse is kept constant.

A preferred embodiment of a circuit arrangement according to the invention, in which in the operating condition of a connected lamp the high-pressure gas discharge lamp is connected in series with a choke coil and an electronic switching element to a direct voltage source and the electronic switching element is connected to a control device, is characterized in that the control device comprises a high-frequency generator, an output of which is connected to a frequency divider which produces, from the high-frequency, a signal having the pulse recurrence frequency, and whose duty cycle can be adjusted in a monostable triggering stage connected to the frequency divider. This circuit arrangement has the advantage, that only one generator is needed for producing both the high-frequency and the low pulse recurrence frequency. By the use of a frequency divider it is attained that the start of each low frequency current pulse is fixedly correlated to the start of a high-frequency pulse.

Preferably, in this circuit arrangement the output of the high-frequency generator is moreover connected to a clock input of a bistable triggering stage and an output of the monostable triggering stage is connected to a conditioning input of the bistable triggering stage, of which an output is connected, as the case may be via an amplifier, to the control device of the electronic switching element.

If, in such a circuit arrangement for measuring and stabilizing the lamp current, a current measuring resistor is connected in series with the high-pressure gas discharge lamp, according to a further embodiment of the invention, an output of a comparator connected to the measuring resistor and a reference voltage source can be connected to a reset input of the bistable triggering stage.

BRIEF DESCRIPTION OF THE DRAWING

In order that the invention may be readily carried out, it will now be described more fully, by way of example, with reference to the accompanying drawing, in which.

DESCRIPTION OF THE PREFERRED EMBODIMENTS

Figure 1:
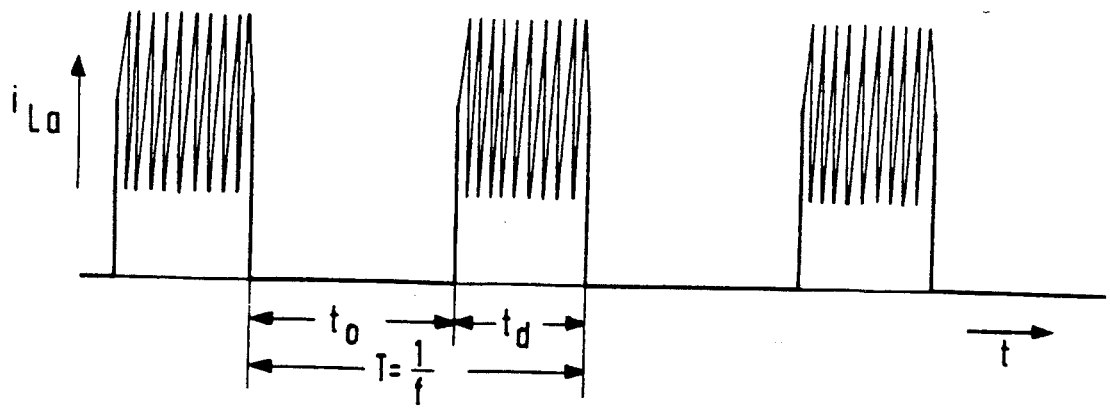
FIG. 1 shows a pulse diagram of the current by which a high-pressure gas discharge lamp can be operated, the unipolar current pulses having superimposed on them a current of higher frequency.

FIG. 1 shows the pulse diagram of a unipolar supply current $i_{La}$ of a high-pressure gas discharge lamp, T representing the pulse period, $t_d$ representing the pulse width of the square wave pulses and $t_o$ being the pulse intervals. The duty cycle $\delta = t_d/T$ is then about 0.4. The pulse recurrence frequency f lies between 50 and 2000 Hz. A high-frequency current between 20 and 200 kHz is superimposed on the individual current pulses. The modulation ratio is then about 0.5.

Figure 2:
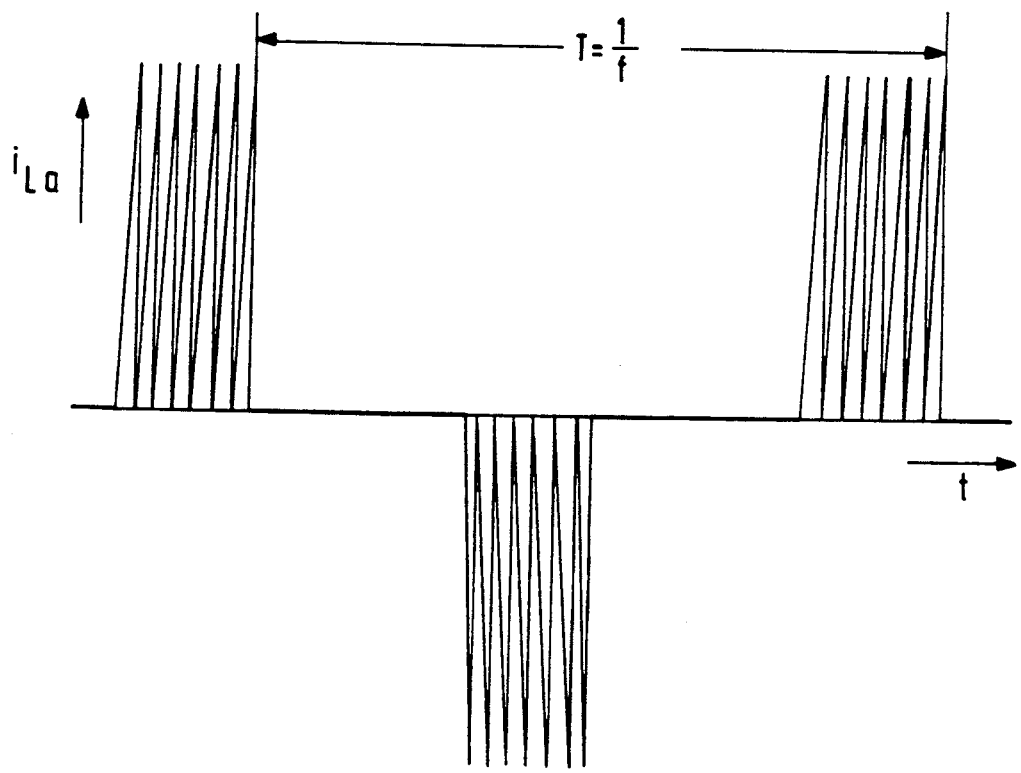
FIG. 2 shows a diagram of the current of high-pressure gas discharge lamps consisting of bipolar pulses.

FIG. 2 shows the pulse diagram of a bipolar supply current $i_{La}$ of a high-pressure gas discharge lamp. In this case, the duty cycle $\delta = 2t_d/T$ is also about 0.4. Again a high-frequency current is superimposed on the low-frequency current pulses, the modulation ratio being 1.

Figure 3:
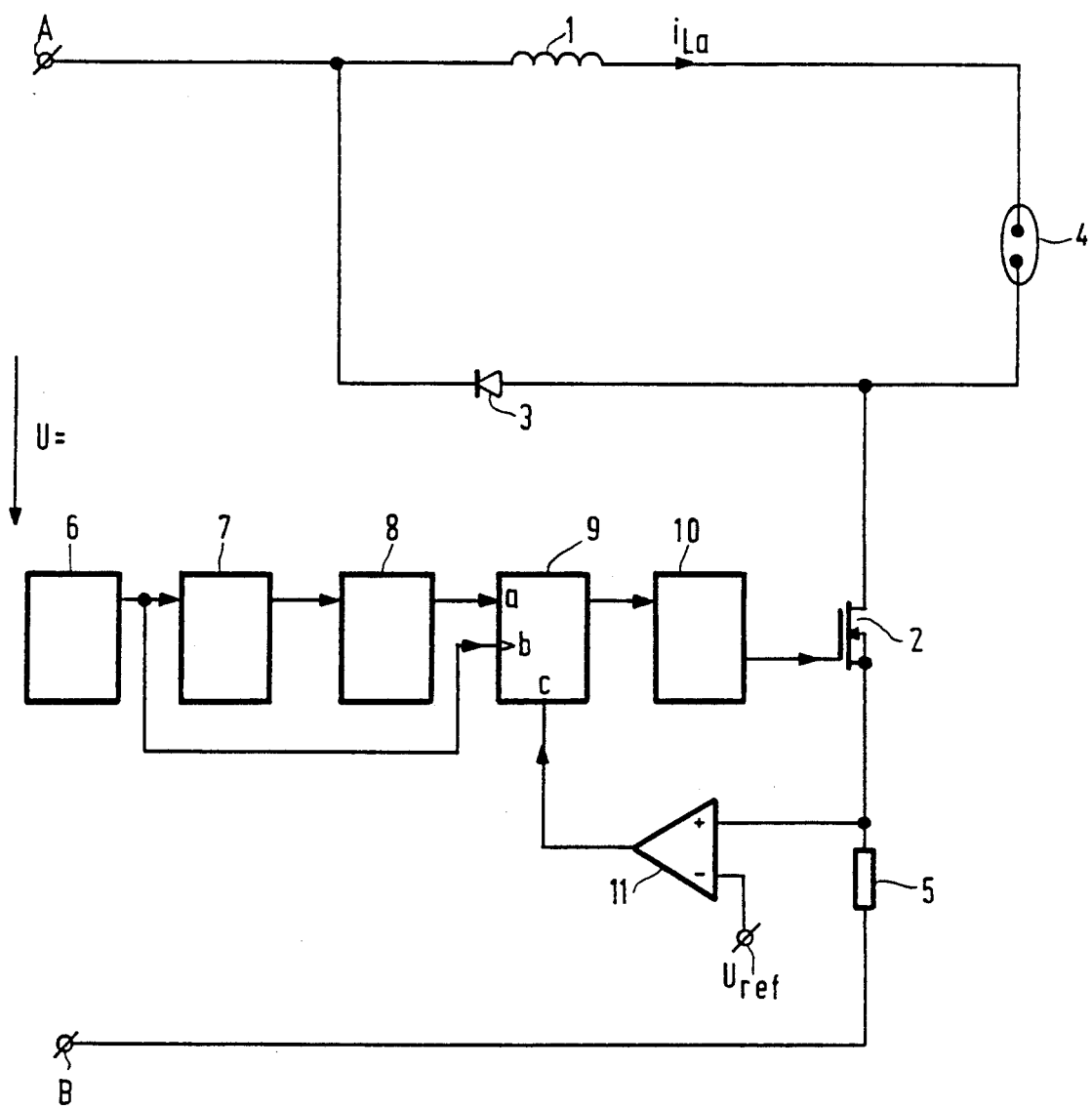
FIG. 3 shows a circuit arrangement for the pulse operation of a high-pressure gas discharge lamp.

In the circuit arrangement shown in FIG. 3, A and B designate the output terminals of a direct voltage source $U=$ of, for example, a combinatorial circuit part. First the terminal A has connected to it a down converter, and comprises a choke coil 1, a MOSFET switching transistor 2, a fly-wheel diode 3 and a high-pressure gas discharge lamp 4 as the load. The down converter has connected to it a current measuring resistor 5, which is connected in series with the lamp 4 and whose free end is connected to the terminal B.

The control device of the switching transistor 2 includes a high-frequency generator 6, of which an output is connected to a frequency divider 7, which produces from the high-frequency a signal having a low pulse recurrence frequency, whose duty cycle can be adjusted in a monostable triggering stage 8 connected to the frequency divider 7. Moreover, the output of the high-frequency generator 6 is connected to a clock input b of a bistable triggering stage 9 and an output of the monostable triggering stage 8 is connected to a conditioning input a of the bistable triggering stage 9. An output of trisser stage 9 is connected through an amplifier 10 to the control electrode of the switching transistor 2. An output of a comparator 11, connected to the measuring resistor 5 and to a reference voltage source $U_{ref}$ is connected to a reset input c of the bistable triggering stage 9.

From this control device a control signal consisting of the superimposition of a low-frequency signal and of a high-frequency signal is supplied to the control electrode of the switching transistor 2. The pulsatory lamp supply current $i_{La}$ is produced in that the switching transistor 2 is first driven by the low-frequency signal. In the time intervals $t_0$, in which this signal has the value 0, the switching transistor 2 is cut off so that no current can flow through the lamp 4. In the time intervals $t_d$, in which the low-frequency signal has the value 1, the switching transistor 2 is switched to the conductive state at a high-frequency.

In order to obtain a lamp current as constant as possible, the current is measured by means of the measuring resistor 5 and the corresponding measuring voltage is supplied to the comparator 11. If the current and hence the measuring voltage across the measuring resistor 5, exceeds the reference $U_{ref}$ adjusted at the comparator 11, the comparator 11 triggers the bistable triggering stage 9 through the reset input c, after which the control signal for the switching transistor 2 again assumes the value 0. Since the current through the choke coil 1 must be steady, the current now flows from the choke coil 1 through the lamp 4 and the fly-wheel diode 3. The energy stored in the choke coil 1 during the increasing current is supplied to the lamp 4 within the high-frequency cut-off time of the switching transistor 2 so that the lamp current can be maintained constant. Because of the superimposed high-frequency, it can now be ensured that at an instant at which the choke coil current has not Yet become considerably smaller, the bistable triggering stage 9 is again set through the clock input b and hence the switching transistor 2 is again switched to the conductive state already by means of a further high-frequency pulse. The current now flowing again through the choke coil 1, the lamp 4 and the switching transistor 2 again increases until the voltage drop at the measuring resistor 5 again exceeds the reference voltage $U_{ref}$ at the comparator 11. Thus, altogether a comparatively constant lamp current with superimposed high-frequency is permitted, which does not become zero again until the switching transistor 2 is cut off for a longer period of time by the next low-frequency switching-off signal.

In a practical embodiment, the lamp 4 was a 30 W high-pressure sodium vapour discharge lamp. By means of the high-frequency generator 6, a high-frequency square wave signal of 48 kHz was produced, from which the desired low-frequency of 300 Hz was derived in the frequency divider 7 (160:1). In the monostable triggering stage 8, the duty cycle of 0.4 favourable for the lamp operation was adjusted. The bistable triggering stage 9 remained cut off during the low-frequency switching-off signal (time interval $t_0$) and was alternately switched on by the high-frequency generator 6 and switched off by the comparator 11 during the switching-on signal (time interval $t_d$). The signal supplied by the bistable triggering stage 9 was amplified by means of an amplifier 10 and was used for the direct control of the switching transistor 2. The modulation ratio was 0.8.

A 400 W high-pressure metal halide vapour discharge lamp was operated in a similar manner with a pulsatory supply current having a pulse recurrence frequency of 1500 Hz and a modulated high-frequency of 150 kHz. The duty cycle was 0.6 and the modulation ratio was 0.3.

In both embodiments, the lamps did not exhibit flickering phenomena during operation. The lamp currents remained stable even in the case of a longer operating time.

What is claimed is:

1. A circuit arrangement for the operation of at least one high-pressure gas discharge lamp comprising: means coupled to the lamp for supplying the lamp with a pulsatory supply current having a pulse recurrence frequency between 50 and 2000 Hz and a duty cycle between 0.2. and 0.8, and means for superimposing on the pulsatory current a current having a high-frequency between 20 and 200 kHz and with a modulation ratio between 0.3 and 1, the high-frequency being an integral multiple of the pulse recurrence frequency.

2. A circuit arrangement for operating at least one high-pressure gas discharge lamp comprising:
 a pair of input terminals for connection to a source of direct voltage,
 a ballast inductor,
 a controlled electronic switching device,
 means for connecting the ballast inductor, the electronic switching device and the lamp in a series circuit across said pair of input terminals, and
 a control device having an output coupled to a control electrode of the electronic switching device and arranged to trigger the electronic switching device on and off so as to provide the lamp with a pulsatory supply current having a pulse recurrence frequency between 50 Hz and 2000 Hz, a duty cycle between 0.2 and 0.8, and with a high-frequency current at a frequency between 20 KHz and 200 KHz superimposed on the pulsatory current and having a modulation ratio between 0.3 and 1.

3. A circuit arrangement as claimed in claim 2, wherein the control device comprises:
   a high-frequency generator having an output connected to a frequency divider which produces from a high-frequency output signal of said high-frequency generator a further signal varying at the pulse recurrence frequency, and
   a monostable trigger device connected to an output of the frequency divider and adapted to adjust the duty cycle of said further signal.

4. A circuit arrangement as claimed in claim 2, wherein said control device further comprises means for setting said high-frequency current to a frequency that is an integral multiple of the pulse recurrence frequency.

5. A method of operating a high-pressure gas discharge lamp with a pulsatory supply current comprising:
   energizing said high pressure discharge lamp with a low frequency pulse type supply current at a pulse recurrence frequency between 50 Hz and 2000 Hz and with a duty cycle between 0.2 and 0.8, and
   superimposing on the low frequency pulse type supply current a high-frequency current at a frequency between 20 KHz and 200 KHz and with a modulation ratio between 0.3 and 1,
   said high frequency being an integral multiple of the pulse recurrence frequency.

6. A circuit arrangement as claimed in claim 3 further comprising means connecting the output of the high-frequency generator to a clock input (b) of a bistable trigger stage and an output of the monostable trigger device to a conditioning input (a) of the bistable trigger stage, and means connecting an output of the bistable trigger stage to the control electrode of the electronic switching device.

7. A circuit arrangement as claimed in claim 6 further comprising means for connecting a current measuring resistor in series with the high-pressure gas discharge lamp, a comparator having a first input connected to the measuring resistor and a second input to a reference voltage source, and means connecting an output of the comparator to a reset input (c) of the bistable trigger stage.

* * * * *